Inventor
JACK V. BROWNING

Inventor
JACK V. BROWNING

Patented Jan. 31, 1950

2,496,083

UNITED STATES PATENT OFFICE 2,496,083

AIRCRAFT CONTROL

Jack V. Browning, Albuquerque, N. Mex.

Application January 15, 1946, Serial No. 641,314

1 Claim. (Cl. 244—113)

This invention relates to aircraft control, and has more particular reference to improved means for checking the speed and increasing the lateral stability of an airplane so as to provide for safe landing of the airplane at slow speed and within a short distance as required on small landing fields.

In accordance with the present invention, the airplane is provided with a hollow nose which defines a confined space within which is housed the engine which directly drives the front tractor propeller of the airplane which is arranged in front of the nose. The nose has a central front air inlet and its rear portion constitutes a cowl having similar circumferentially elongated air exit openings at least in opposite sides of the upper portion thereof. Braking and closure flaps are associated with each air exit opening for regulating the volume of air passing through and discharged from the confined space and for checking the speed of the airplane, in such a manner as to control the lateral stability of the airplane. For attaining different controlling effects, the braking and closure flaps include independently operable sets, each set including certain similar flaps of both air exit openings.

The exact nature of the present invention, as well as more specific objects and features thereof, will become apparent from the following description when considered in connection with the accompanying drawings, in which.

Figure 2:
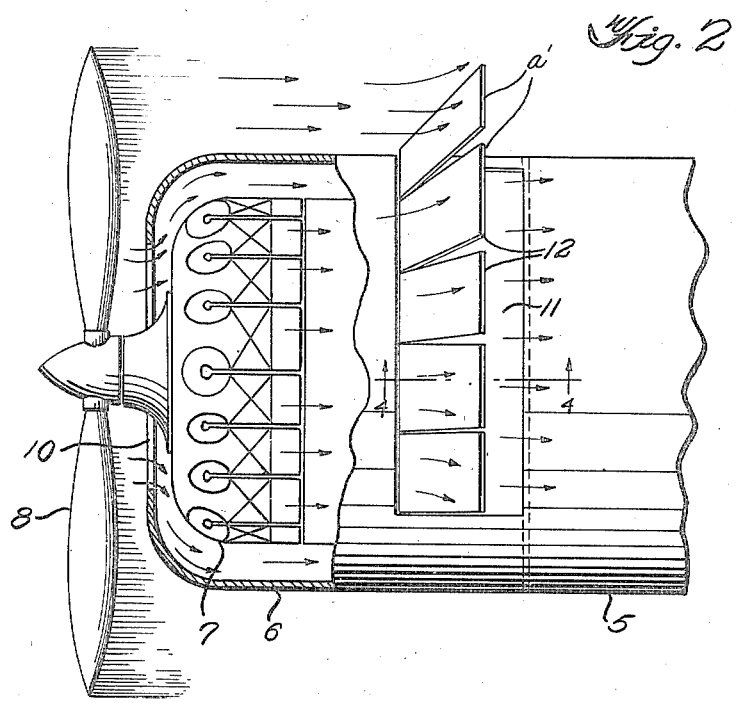
Figure 2 is an enlarged fragmentary view of the nose portion of the airplane shown in Figure 1, partly in side elevation and partly broken away and in vertical section.
Figure 1:
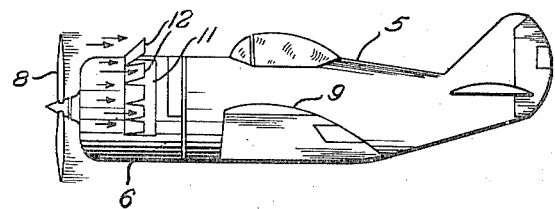
Figure 1 is a side elevational view of an airplane equipped with control means embodying the present invention.
Figure 3:
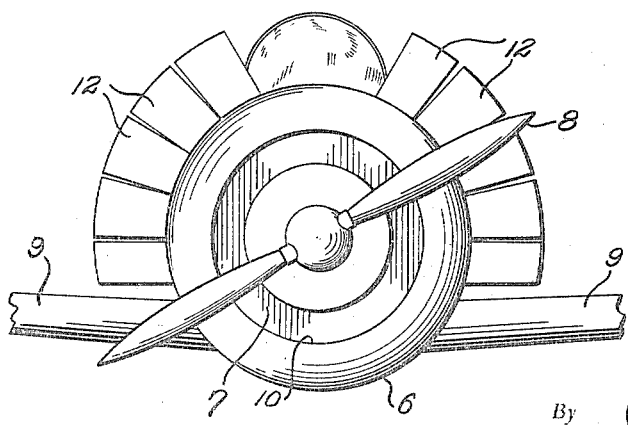
Figure 3 is a front elevational view of the construction as shown in Figure 2.

Referring in detail to the drawings, 5 indicates the body of an airplane having a hollow nose portion 6 within the forward portion of which is housed the engine 7 which directly drives the usual front tractor propeller 8 that is arranged directly in front of the nose 6. The body of fuselage 5 has the usual lateral planes or wings 9.

In accordance with the present invention, the nose 6 has a central front air inlet to receive part of the air delivered rearwardly by the propeller 8, and the rear portion of the nose 6 constitutes a cowl which is provided with similar air exit openings 11 at least in opposite sides of the upper portion thereof. The openings 11 are elongated circumferentially of the nose, and hinged at their front edges to the nose along the front edge of each exit opening 11 are a plurality of braking and closure flaps 12. The flaps 12 are in the form of plates which open outwardly and forwardly from and close rearwardly and inwardly to a position flush with the nose. As the propeller 8 is of a size greater than the diameter of the nose 6, part of the air delivered rearwardly by the propeller will pass outside the nose into contact with the flaps 12 when the latter are open, thereby deflecting this portion of the air outwardly or away from the body of the airplane. This has both a braking and stabilizing effect, which provides for increased lateral stability of the airplane and safe landing of the latter at slow speed. The degree of opening of the flaps 12 provides for regulating the volume of air passing through the confined space within the nose and discharge therefrom through the openings 11. By varying the degree of opening of the flaps, and thereby regulating the volume of air allowed to pass through the interior of the nose and from the latter through the openings 11, the checking or braking action may be varied.

Figure 5:
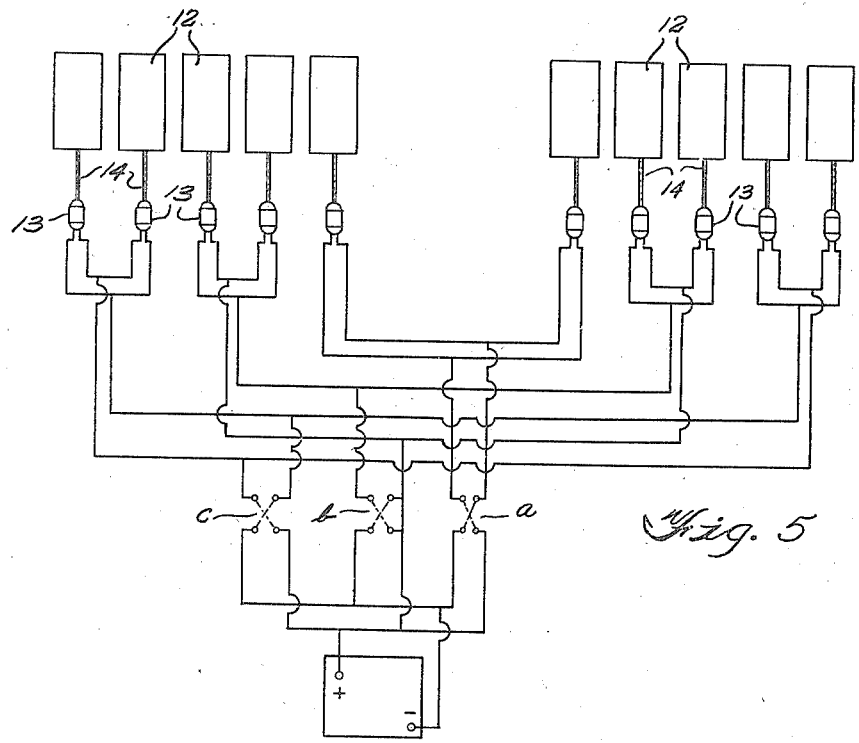
Figure 5 is a diagrammatic view showing one manner in which the braking and closure flaps may be operated and controlled in sets.
Figure 4:
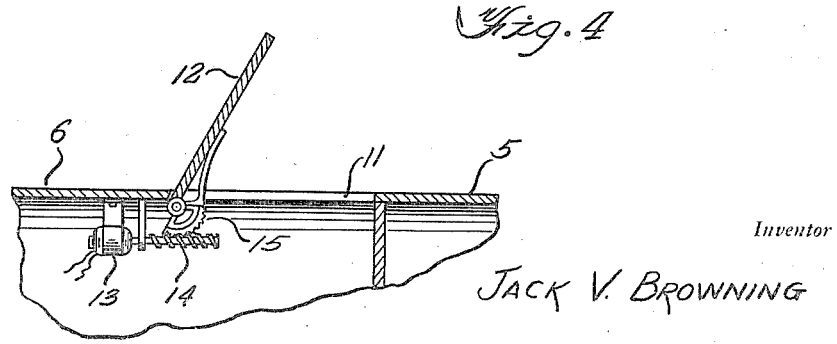
Figure 4 is an enlarged fragmentary longitudinal section through one of the braking and closure flaps, taken on line 4—4 of Figure 2.

Any suitable means may be provided for opening and closing the flaps 12 at will, and such means is preferably such as to independently operate the flaps in a plurality of sets, with each set comprising one or more similar flaps associated with both exit openings 11. As shown in Figures 4 and 5, each flap 12 may be operated by a reversible electric motor 13 whose drive shaft carries a worm 14 meshing with a worm gear segment 15 secured to the hinged edge of the associated flap 12. The motors 13 for the uppermost flaps 12 of each exit opening 11 may be controlled by a reversing switch $a$; the motors of the next two lower flaps 12 of both air exit openings 11 may be controlled by a reversing switch $b$, and the motors for the two lower flaps 12 of both exit openings 11 may be controlled by a reversing switch $c$. Thus, the flaps may be independently operated in sets with the possibility of operating any one or more sets at a time. In this way, a varied control may be had for securing the desired braking and lateral stabilizing effect as required by existing conditions. Obviously, the switches $a$, $b$, $c$, may be placed within convenient reach of the pilot and may be operated to drive the motors 13 in the proper direction to open or close the flaps as desired or found necessary.

The action of the rearwardly driven air on the outer surfaces of the flaps 12 when the latter are partially opened, and the simultaneous action of controlling the flow of air through the nose so that the air discharged through the exit openings 11 act on the inner surfaces of said flaps, has a very efficient effect in giving the airplane lateral stability, with the result that it is possible to safely land the airplane at slow or decreased speed and within a short distance as required on small landing fields. It is to be understood that the invention is susceptible of modification and changes in details such as fairly fall within the scope of the invention as claimed. For instance, other means may be utilized for actuating the flaps and for controlling them in different ways as best suited to different types of airplanes and in accordance with conditions met with.

What I claim is:

In combination with an airplane fuselage having a hollow nose defining a confined space, said nose having a central front air inlet and including a rear cowl portion having similar circumferentially elongated air exit openings at least in opposite sides of the upper portion thereof, a tractor propeller operating in front of said nose and delivering air rearwardly into said central front air inlet and rearwardly about the nose, a plurality of braking and closure flaps for each air exit opening, said flaps being hinged at their front edges to the nose at the front edges of the air exit openings to open outwardly and forwardly from and to close rearwardly and inwardly to a position flush with the nose, and manually controlled means for selectively operating said flaps in a plurality of sets with each set consisting of similar ones of the flaps for both air exit openings, said manually controlled means including a motor driven opening and closing mechanism for each flap, and means to simultaneously throw the mechanism of predetermined similar flaps of both openings into and out of operation.

JACK V. BROWNING.

REFERENCES CITED

The following references are of record in the file of this patent:

UNITED STATES PATENTS

| Number | Name | Date |
| --- | --- | --- |
| 2,319,463 | Lear | May 18, 1943 |
| 2,332,465 | Lee | Oct. 19, 1943 |
| 2,384,088 | Hagen | Sept. 4, 1945 |

FOREIGN PATENTS

| Number | Country | Date |
| --- | --- | --- |
| 139,827 | Great Britain | Mar. 18, 1920 |